United States Patent [19]

Easterly

[11] 4,192,457
[45] Mar. 11, 1980

[54] AUXILIARY TRUCK HEATER

[76] Inventor: Herbert D. Easterly, P.O. Box 767, Crossville, Tenn. 38555

[21] Appl. No.: 938,007

[22] Filed: Aug. 30, 1978

[51] Int. Cl.$^2$ .......................................... B60H 1/02
[52] U.S. Cl. .............................. 237/12.3 C; 126/101; 237/19; 431/247
[58] Field of Search ................... 126/101; 237/12.3 R, 237/12.3 A, 12.3 B, 12.3 C, 19; 431/247

[56] References Cited

U.S. PATENT DOCUMENTS

| | | | |
|---|---|---|---|
| 1,681,305 | 8/1928 | Moneuse | 237/19 |
| 2,021,569 | 11/1935 | Pasco | 126/101 |
| 2,225,023 | 12/1940 | Watt | 126/101 |
| 2,269,055 | 1/1942 | Gower | 126/101 |
| 2,533,508 | 12/1950 | Riu | 126/101 |
| 2,616,412 | 11/1952 | Backus | 126/101 |
| 3,131,864 | 5/1964 | Young | 237/12.3 B |
| 3,237,608 | 3/1966 | Brandle | 237/19 |
| 3,269,382 | 8/1966 | Roman et al. | 126/101 |
| 3,404,674 | 10/1968 | Albert | 126/101 |
| 3,765,389 | 10/1973 | Henchel | 431/121 |
| 3,840,321 | 10/1974 | Moench | 431/247 |
| 4,105,158 | 8/1978 | Hasebe et al. | 126/101 |
| 4,139,055 | 2/1979 | Thomason et al. | 237/19 |

*Primary Examiner*—Henry C. Yuen
*Attorney, Agent, or Firm*—Jenkins, Coffey, Hyland, Badger & Conard

[57] ABSTRACT

A heater apparatus adapted to be used as an auxiliary unit to the main heater system of a vehicle jointly heats the vehicle engine to operating temperature and heats the fuel line while the engine is inactive. The heater apparatus includes improvements for reducing heat dissipation, providing easy accessibility to the burner assembly, and for automatic ignition of the heating element. In addition, the heater operates directly from the vehicle fuel supply thereby eliminating the need for carrying any auxiliary fuel supply for the heater.

17 Claims, 3 Drawing Figures

AUXILIARY TRUCK HEATER

The present invention relates generally to heater apparatus for vehicles, such as semi-trailer tractors, which are auxiliary to the main heating system for jointly heating the vehicle engine to operating temperature and heating the vehicle passenger compartment while the vehicle engine is in a down condition or not in operation. More particularly, the present invention provides an improved heater apparatus which reduces heat dissipation, is automatically ignitable, and operates directly off of the fuel supply of the vehicle. Furthermore, there is provided means for preheating the vehicle fuel line before combustion.

Various heater systems and apparatus having previously been developed to preheat or maintain an internal combustion engine at a relatively high temperature during cold weather when the engine is inactive in order to facilitate starting. For example see Thomas, U.S. Pat. No. 3,159,153; Hraboweckyj, U.S. Pat. No. 3,304,004; Henchel, U.S. Pat. No. 3,765,389; Miza, U.S. Pat. No. 3,158,192; Holmes, U.S. Pat. No. 3,236,220; Lindsey, U.S. Pat. No. 3,400,700; and Kimberlin, U.S. Pat. No. 2,737,169. Furthermore, as is well known to those skilled in the art, various types of heater assemblies have been developed for heating the passenger compartment of the vehicle either by utilizing the heat generated by the vehicle engine during its operation or by utilizing an auxiliary heater unit which generates its own heat.

In addition to heating the vehicle engine while it is inactive in order to facilitate starting, it is many times also desirable to heat the passenger compartment of the vehicle while the engine is inactive. For example, the passenger of the vehicle may desire to sleep in the passenger compartment during the night, and, therefore, for such an extended period of time it would be desirable to turn off the vehicle engine. As disclosed by Hraboweckyj in U.S. Pat. No. 3,304,004, efforts have been made to combine an auxiliary heater for the vehicle engine with a heater apparatus for also heating the passenger compartment when the engine is inactive.

One of the many problems which are prevalent in prior heater apparatus is that they require an auxiliary supply of fuel such as propane gas, butane gas or fuel oil for operation (see Lindsey et al. U.S. Pat. No. 3,400,700; Kimberlin, U.S. Pat. No. 2,737,169; and Hraboweckyj). Recently it has become apparent that carrying auxiliary tanks containing one or more of these fuels presents a dangerous condition due to the possibility of explosions. Accordingly, it is desirable and many times required that an an auxiliary heater apparatus operate from the same fuel supply as the vehicle engine.

Further problems which have been found to exist in prior heater apparatus are manual ignition of the burner assembly (Hraboweckyj U.S. Pat. No. 3,304,004) and difficulty in accessibility to the heating means for service. Most heater apparatus which supply auxiliary heat to the passenger compartment also lose a considerable amount of heat by dissipation through the heater housing or conduit.

In addition to providing a heater apparatus which will jointly heat the vehicle engine and the vehicle passenger compartment while the engine is inactive, it is many times further desirable to preheat the fuel line before combustion in the engine. It is well known that when diesel fuel is allowed to set in a sustained cold environment for a substantial period of time, its viscosity tends to increase thereby retarding the flow of the fuel. Accordingly, by also preheating the diesel fuel line before attempting to start an engine which has been inactive for a period of time, starting is further facilitated.

The heater apparatus of the present invention solves these and other problems previously experienced with prior heaters by the various improvements shown in the Figures and more completely described hereafter.

In accordance with the present invention in its broadest concept, there is provided an improved heater apparatus for jointly heating a vehicle engine to operating temperature and heating the vehicle passenger compartment while the engine is inactive.

Accordingly, it is a feature of the present invention to provide a heater apparatus which includes a housing having two heated chambers disposed adjacent a combustion chamber, one for heating a fluid circulated therethrough and the other for heating air circulated therethrough thereby reducing heat dissipation through the housings of the heated chambers.

Another feature of the present invention is to provide a heater apparatus which includes means for automatically igniting the burner assembly and in which the burner assembly is easily accessible for servicing.

Still another important feature of the present invention is to provide a heater apparatus which eliminates the requirement for an auxiliary fuel supply by operating directly from the existing vehicle fuel supply.

A further feature of the present invention is to provide a heater apparatus as described hereinabove which includes means for preheating the fuel line prior to combustion in the engine.

Other features and advantages of the present invention will be apparent from the following detailed description of a preferred embodiment thereof, which description should be considered in conjunction with the accompanying drawings.

Figure 1:
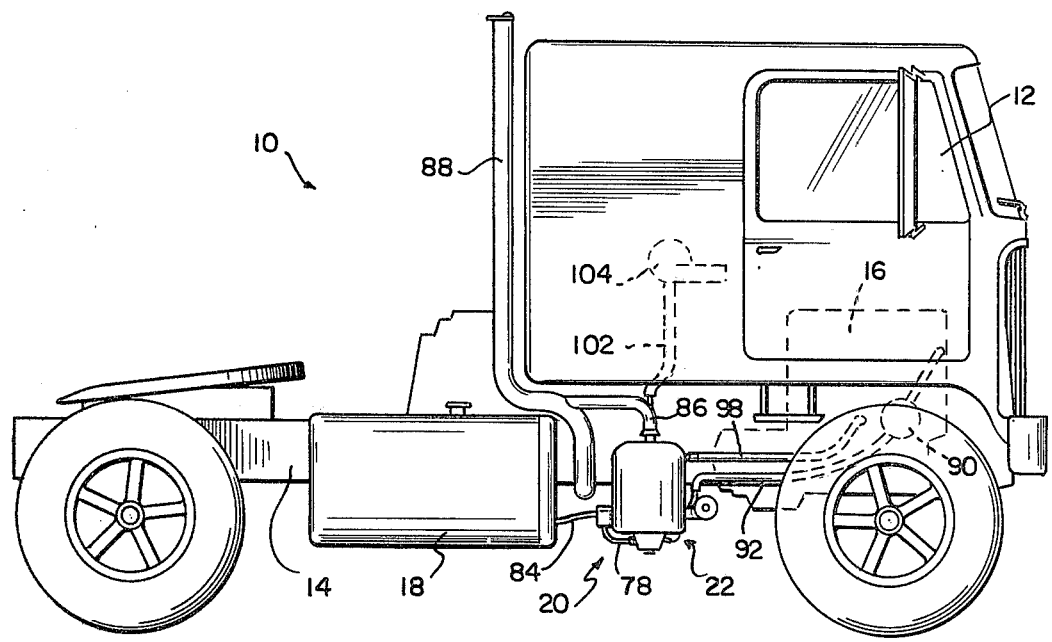
FIG. 1 is an elevational view of a conventional semi-trailer tractor with an auxiliary heater of this invention
Figure 2:
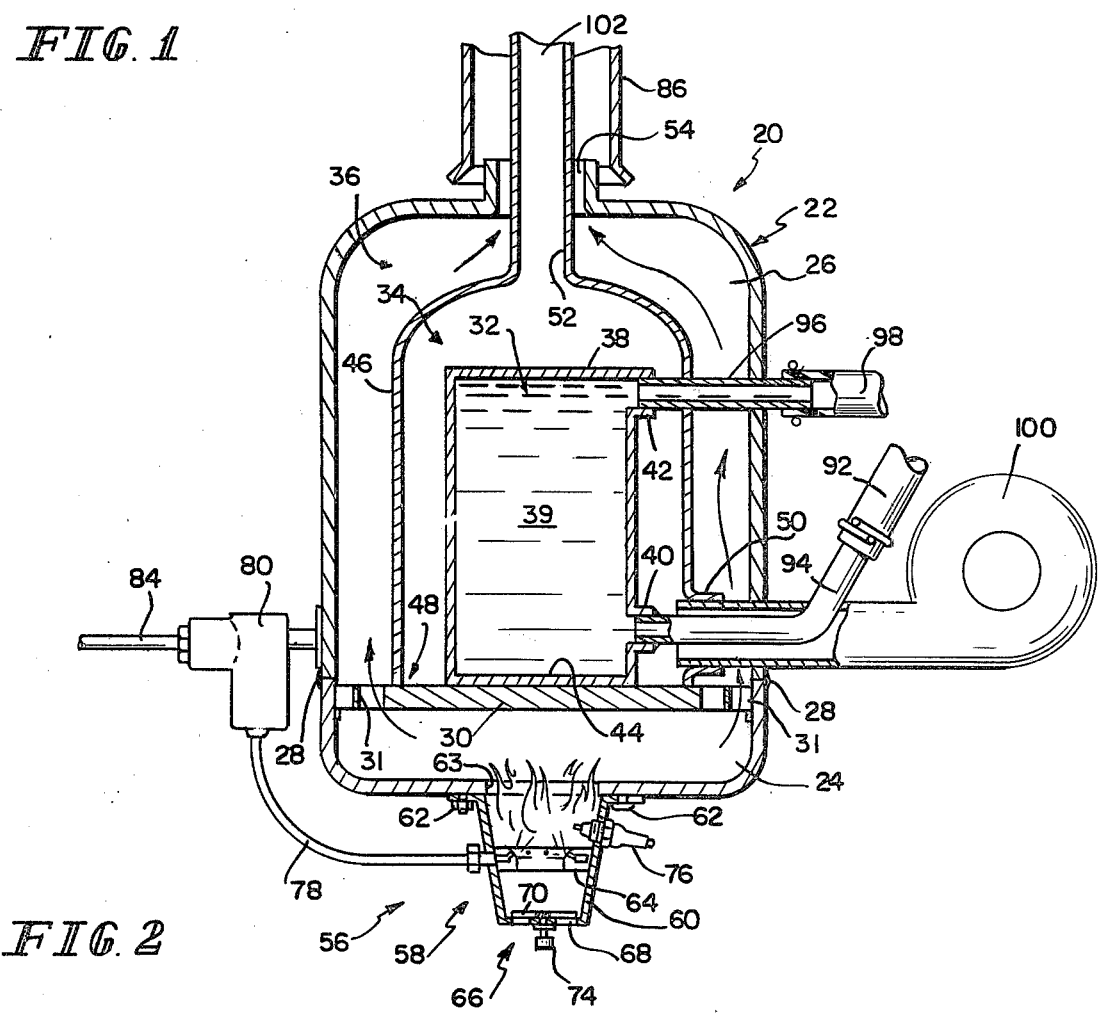
FIG. 2 is a transverse section through the auxiliary heater of FIG. 1.

Referring now to the drawings, and particularly to FIGS. 1 and 2, the present invention is illustratively associated with a semi-trailer tractor 10, which would include a cab 12, for the driver and passengers, a frame 14, supporting the cab 12, an engine 16, and fuel tanks 18. Supported by a bracket (not shown) on frame 14, is an auxiliary heater 20. Auxiliary heater 20 provides heat to the engine 16 and cab 12 when the tractor 10 is in a down condition, or the engine 16 is not in operation.

Auxiliary heater 20 includes a housing 22, which may be formed in the same manner as a conventional propane tank. Housing 22 includes a lower housing forming a lower compartment 24 and an upper housing forming an upper compartment 26. The lower housing and upper housing have been welded or otherwise attached together as indicated at 28. Located in the top portion of lower compartment 24 is a heat conducting plate 30. Housing 22 encloses in the upper compartment three separate chambers including, a first heated chamber 32, a second heated chamber 34 and an exhaust chamber 36.

The first heated chamber 32 includes a water tank 38 having an intake port 40, an exhaust port 42 and a bottom plate 44 in physical contact with heat conducting plate 30. Water 39 in water tank 38 will be heated as it travels between input port 40 and exhaust port 42 by heat being transferred from plate 30, through bottom plate 44.

The second heated chamber 34 includes a housing 46, an intake port 50, an exhaust port 52 with a lower end portion 48, of housing 46, being closed by heat conducting plate 30.

The exhaust chamber 36 is enclosed by housing 22 and provided with an exhaust port 54.

Located under housing 22, for the purpose of providing a heating means 56, is a burner assembly 58. Burner assembly 58 includes a cup-shaped housing 60 attached by means of quick disconnect coupling 62 adjacent an opening 63 located beneath plate 30 in housing compartment 24 for service to burner assembly 58. Burner assembly 58 also includes a fuel atomizing manifold 64 located intermediate the opening 63 and an air control means 66, located at the bottom of housing 60. Air control means 66 includes a plurality of apertures 68, in the housing 60 and a rotatable plate 70 having openings 72 to register with apertures 68 in the housing 60 and vary the area of the openings available to air flow. Plate 70 may be manually adjusted through knob 74.

Intermediate the opening 63 and the fuel atomizing manifold 64, is a glow plug 76 for the purpose of igniting the atomized fuel from the atomizing manifold 64. Fuel is supplied to heating means 56 by means of conduit 78 which receives fuel from a combination filter and electric pump 80 which in turn draws fuel from conventional fuel tank 18 by way of a conduit 84.

As auxiliary heater 22 is electrically energized by an electronic control means (not shown), electricity will be delivered to glow plug 76 and pump 80 to deliver and to ignite and burn the fuel delivered from pump 80 to heating means 56. Fumes from heating means 56 are permitted to exit into chamber 36 through a grill 31, located at the periphery of and integral with heat conducting plate 30. As the exhaust fumes travel upwardly through grill 31, they pass through the exhaust chamber 36 between housing 46 and housing 22, and continue on to exit through exhaust port 54 in housing 22. As seen in FIG. 1, exhaust fumes can be removed from auxiliary heater 22 through an intermediate exhaust pipe 86 which communicates with the conventional exhaust stack 88 of the tractor 10.

As heater means 56 continues to operate, it will heat the heat conducting plate 30, to increase the temperature of the water 39 in first heated chamber 32. A circulation pump 90, as seen in FIG. 1, will circulate water 39 from the engine block 16 through a lower heater hose 92 attached to a pipe 94 into intake port 40 of the water tank 38. As the water 39 is heated it moves out of water tank 38, through exhaust port 42, through pipe 96 and upper heater hose 98, and back into the engine block 16 to complete the flow of water 39 from the engine block 16 through the pump 90, into the tank 38, and back again into the engine block 16.

Second heated chamber 34 receives heat from the heat conducting plate 30 and from heat transferred through housing 46 from exhaust chamber 36. The heated air in the chamber 34 is moved by means of a blower 100, communicating with intake port 50, through chamber 34, and out through exiting conduit 102 into the cab 12. Exiting conduit 102 is connected in housing 22 and extends through exhaust pipe 86. Heated air may enter cabin 12 through the normal cabin heater 104 or can be applied to cabin 12 through a separate heating inlet.

Figure 3:
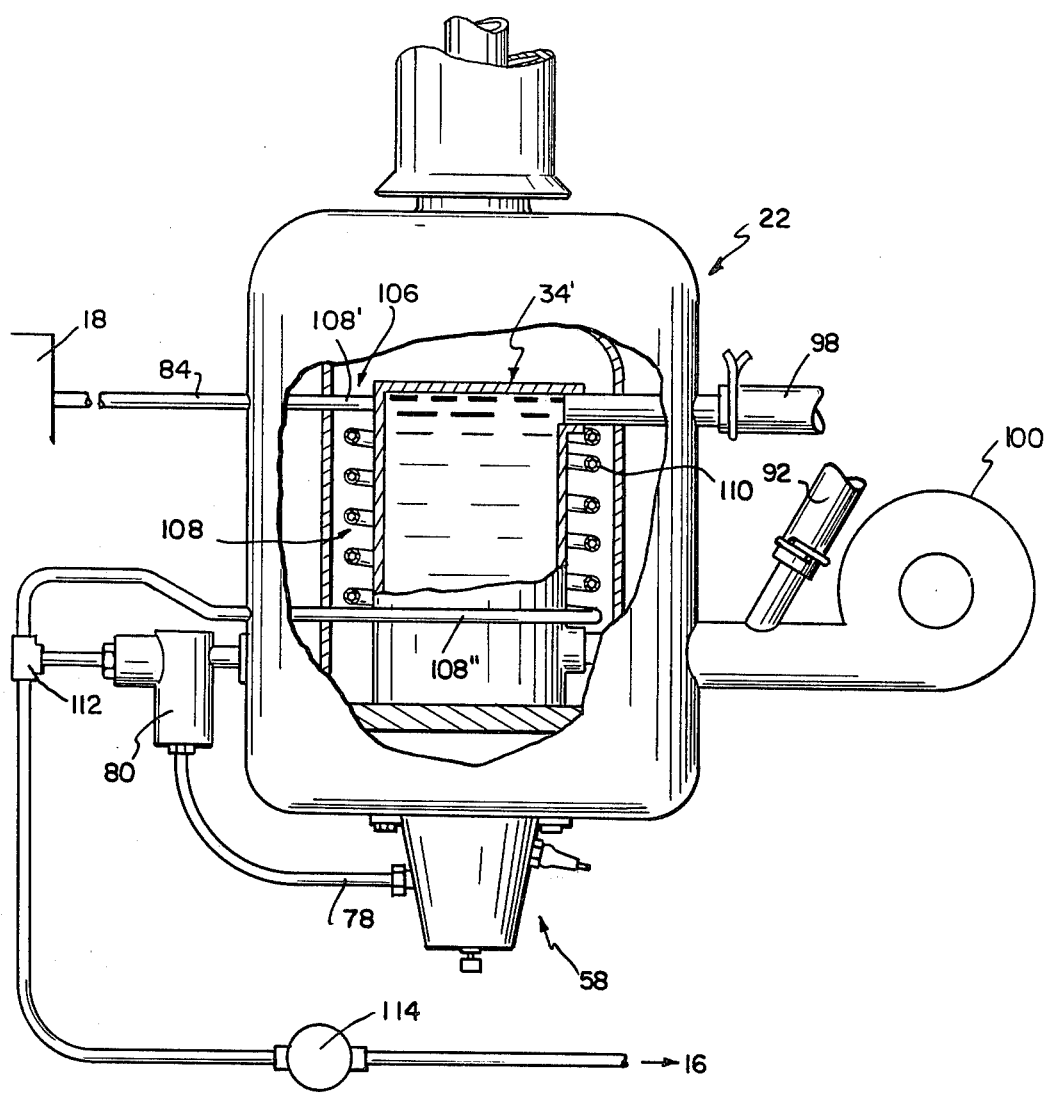
FIG. 3 is a modification of the auxiliary heater shown in FIG. 1 with addition of a preheated fuel means.

It has been found desirable, in some instances, particularly if the fuel is a diesel fuel which tends to thicken at colder temperatures, to provide means for heating the fuel line prior to combustion. Assistance in atomization of fuel in the burner assembly 58, and engine 16 can be accomplished by a modification of the present invention illustrated in FIG. 3. A portion of the auxiliary heater housing 22 has been broken away to illustrate a fuel preheating means 106 located in a second heated chamber 34'. Fuel preheating means 106 includes a helical coil 108, of heat conductive pipe 110, connected at its uppermost turn 108' to fuel supply conduit 84 from the fuel tank 18 and communicates at its lowermost turn 108" through a T-connector 112 to combination filter and fuel pump 80 for burner assembly 58 and to fuel pump 114 for engine 16. It should be understood that as the second heated chamber 34' is heated, helical coil 108 will also absorb the heat in the same chamber 34' to elevate the temperature of the fuel prior to entering pumps 80, and 114. The second heated chamber 34' is heated in the same manner as that described for second heated chamber 34 shown in FIGS. 1 and 2. Although the coil 108 is illustrated located in chamber 34' it should be understood that coil 108 could be located on the outside of housing 22, or around conduit 102. However, locating the coil 108 outside the auxiliary heater 22 would result in a considerable reduction of its ability to preheat to the fuel due to dissipation of heat to the surrounding ambient temperature.

What is claimed is:

1. Heater apparatus comprising a housing including a heating means adjacent its lower end, a wall of thermally conducting material heated by said heating means and an exhaust opening adjacent its upper end,
   a first heated chamber for liquid within said housing and formed in part by said wall of thermally conducting material,
   a second heated chamber for air surrounding said first heated chamber within the housing and formed in part by the wall of thermally conductive material,
   an opening in the wall of thermally conducting material to direct the exhaust of the heating means within said housing and around said first and second heated chambers to said exhaust,
   said heater apparatus being capable of simultaneously heating a liquid and air while reducing heat lost from said first and second chambers and while isolating exhaust of said heating means from the air being heated.

2. Heater apparatus comprising a housing including an exhaust port and heating means detachably coupled thereto, a first heated chamber disposed within the housing for heating a fluid circulated therethrough and a second heated chamber disposed within the housing and encompassing the first heated chamber for heating air circulated therethrough, and the exhaust of the heating means is directed within the housing and around said second heated chamber and the air is heated by the heat transferred from the first heated chamber and through the second heated chamber housing from the exhaust of said heating means, wherein the housing includes an upper compartment and a lower compartment separated by a heat conducting plate, the upper compartment comprising an exhaust chamber which includes the exhaust port, and the lower compartment comprising a burner assembly which includes the heating means for heating the heat conducting plate, the heat conducting plate including a grid located in the periphery thereof for permitting exhaust fumes to exit through the exhaust chamber.

3. The apparatus as recited in claim 2 wherein the housing includes means for automatically igniting the heating means.

4. The apparatus as recited in claim 3 wherein the means for automatically igniting the heating means includes a glow plug which when activated ignites a fuel causing the fuel to burn.

5. The apparatus as recited in claim 2 wherein the first and second heated chambers are disposed within the exhaust chamber of the housing whereby heat dissipation through the housings of the first and second heated chambers is substantially decreased.

6. The apparatus as recited in claim 5 wherein the first heated chamber includes an intake port and an exhaust port for circulating the fluid through the chamber and a lower surface in physical contact with the heat conducting plate for heating the fluid as it circulates through the chamber.

7. The apparatus as recited in claim 6 wherein the second heated chamber includes an intake port in communication with a blower assembly and an exhaust port for circulating air through the second heated chamber and is closed at one end by the heat conducting plate for heating the air as it circulates through the chamber.

8. The apparatus as recited in claim 7 further includes an exhaust pipe coupled to the exhaust port of the combustion chamber and an exiting conduit coupled to the exhaust port of the second heated chamber, the exiting conduit being disposed within the exhaust pipe whereby heat dissipation from the exiting conduit is substantially decreased.

9. Heater apparatus comprising a housing having an upper portion which includes an exhaust port and a lower portion which includes a detachable heating means, a first heated chamber disposed within the housing for heating a fluid circulated therethrough, a second heated chamber disposed within the housing and housing the first heated chamber for heating air circulated therethrough said first and second chambers sharing a common heat conductive wall which is in direct conductive heat exchange relation with said heating means, and means disposed within the second heated chamber for heating a second fluid circulated therethrough whereby the air and second fluid are heated by heat transferred from said heating means to the second heated chamber.

10. The apparatus as recited in claim 9 wherein the means for heating the second fluid includes a coil formed about the first heated chamber.

11. In a heater apparatus adapted to heat a vehicle engine and heat the vehicle passenger compartment while the engine is inactive including heating means for simultaneously heating a fluid circulated through the vehicle engine and for heating air circulated through the vehicle compartment, the improvement wherein said means includes heat conductive walls forming first and second chambers for fluid and air, said walls are disposed within a housing so that said first and second chambers are within an exhaust chamber of said heating means, said first and second chambers sharing one of said walls which is in direct conductive heat transfer relation with said exhaust chamber and the air and fluid are heated by the heating means and its exhaust by heat transferred through the walls of the first and second chambers.

12. The improvement as recited in claim 11 wherein the heating means includes means for automatically igniting the heating means.

13. The improvement as recited in claim 12 wherein means for automatically igniting the heating means includes an electric fuel pump and a glow plug which when activated ignite and burn the fuel delivered by the pump.

14. The improvement as recited in claim 11 further comprising a fuel preheating means disposed within the second chamber and interposed between a vehicle fuel supply and the vehicle engine.

15. The improvement as recited in claim 14 wherein the fuel preheating means is further interposed between the vehicle fuel supply and the heating means.

16. The improvement as recited in claim 15 wherein the fuel preheating means includes a coil formed about the first chamber having its uppermost portion coupled to the vehicle fuel supply and its lowermost portion coupled to the vehicle engine and the heating means.

17. Apparatus to heat simultaneously a vehicle engine, and passenger compartment, comprising
a housing,
means to provide heat within the housing,
a first chamber within said housing for fluid to be circulated through the vehicle engine, and a second chamber within said housing for the circulation of air to the passenger compartment,
said first and second chambers sharing a common heat conductive wall and each being surrounded by and in direct conductive heat transfer relation with an exhaust chamber of said heating means to provide simultaneous heating of fluid for the vehicle engine and air for the passenger compartment and to reduce the heat loss from said first and second chambers.

* * * * *